Dec. 13, 1927.

H. S. F. R. O'BRIEN

ATOMIZER

Filed Feb. 27, 1926

1,652,372

HARRY STAFFORD FRED ROBERT O'BRIEN
INVENTOR

By *[signature]* his ATTY.

Patented Dec. 13, 1927.

1,652,372

UNITED STATES PATENT OFFICE.

HARRY STAFFORD FRED ROBERT O'BRIEN, OF LONDON, ENGLAND.

ATOMIZER.

Application filed February 27, 1926, Serial No. 91,092, and in Great Britain April 28, 1925.

This invention relates to atomizers for atomizing liquid insecticides or germicides or like purposes and the primary object is to provide an improved or novel construction of nozzle structure by means of which the liquid and air or gas are very intimately mixed and issue from the nozzle in the form of a fine mist. Another object is to provide a device of this nature simple in construction and which can be produced cheaply.

With these objects in view the invention consists of a nozzle structure comprising two tubular members, one within the other and spaced to provide an annular channel for liquid between them, the inner member for passage of air or gas under pressure being provided with a constricted outlet terminating in an outwardly directed cone and the outer member provided with an inwardly directed cone communicating with a discharge aperture, the space or chamber between said cones constituting a mixing chamber across which a stream of gas or air under pressure passes and into which the liquid is drawn by suction of the air in a direction reversed in relation to the direction of flow whereby they become intimately mixed, and issue from the discharge aperture in the form of a fine mist.

Figure 1:
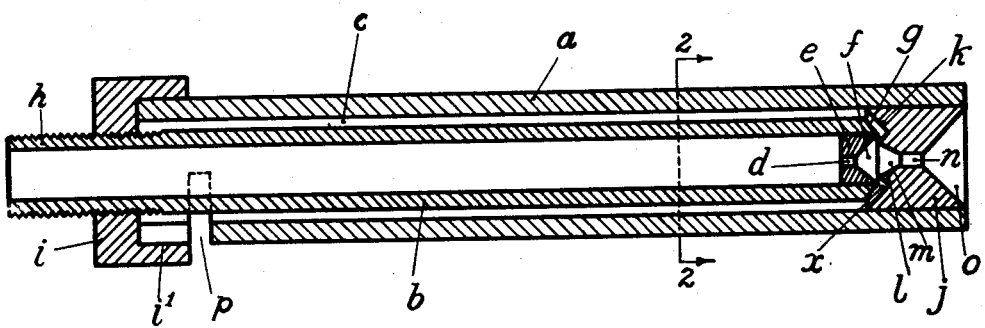
Figure 2:
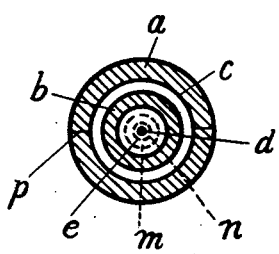
Figure 3:
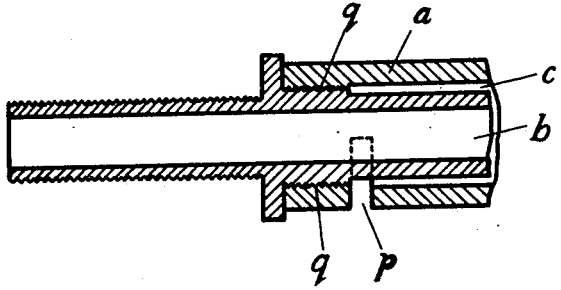

In the accompanying drawings Figure 1 is a longitudinal section of one embodiment of the complete atomizer nozzle; Figure 2 is a cross section on the line 2—2 of Figure 1 and Figure 3 is a partial longitudinal section showing a modification in the mounting of the tubular members of the nozzle.

Referring firstly to Figures 1 and 2, the structure here illustrated comprises two tubes $a$ and $b$ disposed one within the other and of a convenient size to provide an annular space $c$ between them. The inner tube $b$ has a constriction provided near the outlet formed by a narrow channel $d$ in a plug $e$ sweated into tube $b$, said constriction leading into a conical cavity $f$, the end of the tube is exteriorly tapered as at $g$ with the taper extending towards the outlet of the nozzle as shown. At its inner end the said inner tube $b$ is provided with an external screw thread $h$ on which is screwed a nut $i$ recessed on its outer face as at $i'$ to receive the inner or rear end of the outer tube $a$ on which it is a tight push fit, said nut and form of connection providing convenient means of adjusting the space in an axial direction between the outlet end of the inner tube and the inner face of the nozzle element in the outer tube now to be described.

The said outer tube $a$ is fitted with a nozzle element $j$ sweated into its outlet end. The inner face of the nozzle element $j$ is provided with an annular groove $k$ angular in axial cross section forming a tapered projection $l$, from which a reversely tapered aperture $m$ leads into a cylindrical axial bore $n$ of larger diameter than the bore $d$, which in turn leads into another conical cavity $o$ at the extreme outlet end. At its inner or rear end the outer tube has a radially cut slot $p$ by which liquid may enter the annular space $c$ between the two tubes $a$ and $b$. Thus the rear screw-threaded end $h$ of the inner tube $b$ may be screwed into a threaded orifice in the bottom of a cup containing liquid to be atomized, the nozzle being disposed vertically.

The space $x$ formed between the outlet end of the inner tube $b$ and the inner face of the nozzle member $j$ in the outer tube $a$ takes the general form of a broad W in axial cross section as shown in Figure 1, air or gas entering at the centre and liquid at the sides. The air or gas passes along within the inner tube $b$ and liquid along the annular space $c$ and the air current after leaving the channel $d$ passes across the cavity $f$ and into the flaring aperture $m$. The said stream of air passing at high velocity through the cavities $f$ and $m$, which together and for the purpose of this specification may be termed the mixing chamber, causes a partial vacuum in said chamber whereby the liquid in space $c$ is drawn into the cavity $k$ and thence in a reversed direction to the air stream, which picks it up and carries it forward again, the mixed streams meeting and striking the walls of the tapered aperture $m$ at high velocity causing the breaking up of the liquid and an intimate mixture thereof with the air before finally passing through the axial bore $n$ and issuing from the outer conical cavity $c$ in the form of a fine mist. The reversal of direction of flow of the liquid in relation to that of the air provides more resistance to be overcome by the air and consequently a greater splashing and breaking up action than is the case in constructions of nozzle wherein the liquid joins the air with the same direction of flow.

In the modification shown in Figure 3, the inner end of the tube $b$ is enlarged at

*q* and exteriorly threaded to receive the interiorly threaded inner end of the outer tube *a*. The enlargement mentioned provides the annular space *c* between the tubes and the threaded engagement there between the means of axial relative adjustment between the tubes. A radial slot *p* is provided as before in the outer tube for permitting liquid to enter the space *c*.

I claim:—

1. A nozzle structure for an atomizer comprising in combination two tubular members one within the other and spaced to provide an annular channel between them, the inner member being provided with a constricted outlet terminating in an outwardly directed conical passage, the outer member being provided with an inwardly directed conical passage communicating with a discharge aperture, the said members being situated relatively to each other to form a space or chamber including said conical passages constituting a mixing chamber, and a conduit between said annular channel and said mixing chamber debouching into the latter in a direction having a component opposed to the direction of outflow from the inner tubular member.

2. A nozzle structure for an atomizer comprising two tubular members one within the other and spaced to provide an annular channel between them, the inner member being provided with a constricted outlet terminating in an outwardly directed conical passage and the end of the inner member being exteriorly tapered with the taper extending inwardly towards the outlet of the nozzle so that the end in cross section on a plane of the axis of the nozzle is W-shaped, the outer member being provided with an inwardly directed conical passage communicating with a discharge aperture, the said members being situated relatively to each other to form a space or chamber including said conical passages constituting a mxing chamber and a conduit between said annular channel and said mixing chamber debouching into the latter in a direction having a component opposed to the direction of outflow from the inner tubuluar member.

3. A nozzle structure for an atomizer comprising in combination two tubular members one within the other and spaced to provide an annular channel between them, the inner member being provided with a constricted outlet terminating in an outwardly directed conical passage and the end of the inner member being exteriorly tapered with the taper extending inwardly towards the outlet of the nozzle so that the end in cross section on a plane of the axis of the nozzle is W-shaped, the outer member being provided with an inwardly directed conical passage communicating with a discharge aperture, and the end of the outer member being interiorly formed with an annular groove angular in cross section on a plane of the axis of the nozzle around its conical passage the bottom of said angular groove being in alignment with the terminal circular edge of the tapered end of the inner tubular member, the said members being situated and spaced relatively to each other to form a space or chamber including the said conical passages constituting a mixing chamber and to form an annular conduit between the said annular channel and the said mixing chamber which is directed first from the said annular channel to the bottom of the angular groove as an annular conical conduit the apex of the cone being directed in the same direction as the outflow from the nozzle, and continued from the bottom of said groove to the point where it debouches into the mixing chamber in an annular conical conduit the apex of which is directed in the opposite direction to that of the outflow from the nozzle.

4. A nozzle structure for an atomizer comprising in combination two tubular members one within the other and spaced to provide an annular channel between them, the inner member being provided with a constricted outlet terminating in an outwardly directed conical passage, the outer member being provided with an inwardly directed conical passage communicating with a cylindrical axial bore which communicates with an outwardly directed conical passage at the extreme end of the nozzle structure the said members being situated relatively to each other to form a space or chamber including the said first two mentioned conical passages constituting a mixing chamber, and a conduit between said annular channel and said mixing chamber debouching into the latter in a direction having a component opposed to the direction of outflow from the inner tubular member.

5. A nozzle structure for an atomizer comprising in combination two tubular members one within the other and spaced to provide an annular channel between them the inner member being provided with a constricted outlet terminating in an outwardly directed conical passage and the outer member provided with an inwardly directed conical passage communicating with a discharge aperture, the said members being situated relatively to each other to form a space or chamber including the said conical passages constituting a mixing chamber for air or gas and liquid into which the liquid is drawn by suction of the air and in which they meet at high velocity whereby they become intimately mixed, said inner member and outer member having their opposing faces shaped in cross section on a plane of the axis of the nozzle to form an annular conduit between said annular channel and said mixing chamber of the shape of a broad letter W with the top of the letter shape directed against the direction of the outflow from the inner tubular member.

6. A nozzle structure for an atomizer comprising in combination two tubular members one within the other and spaced to provide an annular channel between them, the inner member being provided with a constricted outlet terminating in an outwardly directed conical passage and the end of the inner member being exteriorly tapered with the taper extending inwardly towards the outlet of the nozzle so that the end in cross section on a plane of the axis of the nozzle is W-shaped, the outer member being provided with an inwardly directed conical passage communicating with a discharge aperture, and the end of the outer member being interiorly formed with an annular groove angular in cross section on a plane of the axis of the nozzle around its conical passage the bottom of said angular groove being in alignment with the terminal circular edge of the tapered end of the inner tubular member, the said members being situated and spaced relatively to each other to form a space or chamber including the said conical passages constituting a mixing chamber and to form an annular conduit between the said annular channel and the said mixing chamber which is directed first from the said annular channel to the bottom of the angular groove as an annular conical conduit the apex of the cone being directed in the same direction as the outflow from the nozzle, and continued from the bottom of said groove to the point where it debouches into the mixing chamber in an annular conical conduit the apex of which is directed in the opposite direction to that of the outflow from the nozzle, and means for relative axial adjustment of the inner and outer members to vary the dimension of the mixing chamber and annular conduit.

HARRY STAFFORD FRED ROBERT O'BRIEN.